(12) United States Patent
Watanabe et al.

(10) Patent No.: US 10,403,873 B2
(45) Date of Patent: Sep. 3, 2019

(54) GRAVURE ROLL, METHOD OF FABRICATING A SEPARATOR, AND SEPARATOR

(71) Applicant: Sumitomo Chemical Company, Limited, Tokyo (JP)

(72) Inventors: Koichiro Watanabe, Ehime (JP); Jian Wang, Ehime (JP); Yasutoshi Minemoto, Ehime (JP); Shinya Kimura, Kawasaki (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 84 days.

(21) Appl. No.: 14/888,115

(22) PCT Filed: Oct. 15, 2014

(86) PCT No.: PCT/JP2014/077429
§ 371 (c)(1),
(2) Date: Oct. 30, 2015

(87) PCT Pub. No.: WO2015/056708
PCT Pub. Date: Apr. 23, 2015

(65) Prior Publication Data
US 2016/0226047 A1    Aug. 4, 2016

(30) Foreign Application Priority Data

Oct. 16, 2013  (JP) .................................. 2013-215660

(51) Int. Cl.
*B05C 1/00* (2006.01)
*H01M 2/14* (2006.01)
(Continued)

(52) U.S. Cl.
CPC ............. *H01M 2/145* (2013.01); *B05C 1/027* (2013.01); *B05C 1/0808* (2013.01); *B41N 1/20* (2013.01);
(Continued)

(58) Field of Classification Search
CPC ..... H01M 2/145; H01M 2/1686; B05C 1/027; B05C 1/0808; B05C 1/0817; B05C 1/083
See application file for complete search history.

(56) References Cited

U.S. PATENT DOCUMENTS 5,669,988 A    9/1997   Takenaka et al.
6,723,467 B2   4/2004   Yoshida et al.
(Continued)

FOREIGN PATENT DOCUMENTS

CN    103718338 A    4/2014
CN    103781861 A    5/2014
(Continued)

OTHER PUBLICATIONS

Machine translation of JP 2004-344759, obtained Dec. 13, 2017 (Year: 2014).*
(Continued)

*Primary Examiner* — Nicholas P D'Aniello
(74) *Attorney, Agent, or Firm* — Panitch Schwarze Belisario & Nadel LLP (57) ABSTRACT

A gravure roll, in which the outside peripheral surface of a metal roll main body has a plurality of oblique line shaped protrusions forming a prescribed angle with the center axis of the roll main body and the coating liquid can be held in a plurality of oblique line shaped recesses formed between each of the plurality of protrusions, is configured such that the roll main body has a diamond-like carbon layer on the entire outer peripheral surface thereof, a head part for each of the plurality of protrusions is cut down, and each of the (Continued)

plurality of protrusions has a trapezoidal cross-sectional shape that becomes gradually narrower in width moving in direction toward the head part. A separator with a uniform weight per unit area can be manufactured wherein the coating liquid is coated onto a base material film using this gravure roll.

9 Claims, 2 Drawing Sheets

(51) Int. Cl.
  *H01M 2/16* (2006.01)
  *B05C 1/08* (2006.01)
  *B05C 1/02* (2006.01)
  *B41N 1/20* (2006.01)
  *B41N 1/22* (2006.01)

(52) U.S. Cl.
  CPC ........... *H01M 2/1686* (2013.01); *B05C 1/083* (2013.01); *B05C 1/0817* (2013.01); *B41N 1/22* (2013.01)

(56) References Cited

U.S. PATENT DOCUMENTS

| | | | |
|---|---|---|---|
| 8,597,816 | B2 | 12/2013 | Nishikawa et al. |
| 2002/0053123 | A1 | 5/2002 | Sanda et al. |
| 2003/0017386 | A1 | 1/2003 | Daido et al. |
| 2006/0199294 | A1 | 9/2006 | Fujikawa et al. |
| 2008/0241505 | A1* | 10/2008 | Kobori .................... A61L 9/014 428/317.1 |
| 2012/0301605 | A1 | 11/2012 | Kim et al. |
| 2013/0011716 | A1 | 1/2013 | Sano et al. |
| 2014/0178741 | A1 | 6/2014 | Hasegawa et al. |
| 2014/0242444 | A1 | 8/2014 | Nishikawa et al. |
| 2014/0302389 | A1 | 10/2014 | Hasegawa et al. |
| 2014/0329154 | A1 | 11/2014 | Shinoda et al. |

FOREIGN PATENT DOCUMENTS

| | | | |
|---|---|---|---|
| CN | 103891002 A | | 6/2014 |
| CN | 103946023 A | | 7/2014 |
| JP | H07907 A | | 1/1995 |
| JP | H0860250 A | | 3/1996 |
| JP | H103898 A | | 1/1998 |
| JP | H1111760 A | | 1/1999 |
| JP | 2002192061 A | | 7/2002 |
| JP | 2004227972 A | | 8/2004 |
| JP | 2004344759 A | * | 12/2004 |
| JP | 3756815 B2 | | 3/2006 |
| JP | 2006307163 A | | 11/2006 |
| JP | 2007000730 A | | 1/2007 |
| JP | 2007234518 A | | 9/2007 |
| JP | 2010232048 A | * | 10/2010 |
| JP | 2010264398 A | | 11/2010 |
| JP | 2011194381 A | | 10/2011 |
| JP | 2013125876 A | | 6/2013 |
| JP | 2014205126 A | | 10/2014 |
| WO | 2008156033 A1 | | 12/2008 |
| WO | 2013073362 A1 | | 5/2013 |

OTHER PUBLICATIONS

Machine translation of JP 2011-194381 obtained Dec. 12, 2018 (Year: 2011).*
International Search Report dated Jan. 13, 2015 in International Application No. PCT/JP2014/077429.
Office Action dated Aug. 4, 2015 in JP Application No. 2015525325.
Office Action dated Jan. 5, 2016 in JP Application No. 2015525325.
Notice of Reasons for Refusal dated May 31, 2016 in JP Application No. 2015-083588.
Office Action dated Mar. 28, 2017 in CN Application No. 2014800376963.
Office Action dated Nov. 2, 2017 in U.S. Appl. No. 15/519,191, by Watanabe.
Office Action dated Sep. 27, 2017 in CN Application No. 201580055830.7.
Office Action dated Nov. 16, 2017 in CN Application No. 201480037696.3.

* cited by examiner

GRAVURE ROLL, METHOD OF FABRICATING A SEPARATOR, AND SEPARATOR

CROSS-REFERENCE TO RELATED APPLICATIONS

This application is a Section 371 of International Application No. PCT/JP2014/077429, filed Oct. 15, 2014, which was published in the Japanese language on Apr. 23, 2015, under International Publication No. WO 2015/056708 A1 and the disclosure of which is incorporated herein by reference. The PCT application claims priority from Japanese Patent Application No. 2013-215660, filed on Oct. 16, 2013, the entire disclosure of which, including specification, claims, drawings and summary, is incorporated herein by reference in its entirety.

BACKGROUND OF THE INVENTION

The present invention relates to a gravure roll and a separator both used in a gravure coating apparatus. The present invention relates more particularly to a gravure roll suitable to coating a coating liquid containing therein hard inorganic fillers such as alumina particles, and a method of fabricating a separator through the use of the gravure roll.

BACKGROUND ART

A gravure coating process includes steps of soaking a gravure roll having protrusions and recesses formed on a surface thereof, into a coating liquid to thereby retain the coating liquid in the recesses formed on a surface of the gravure roll, and causing the gravure roll to make contact with a continuously fed base film to thereby coat the coating liquid retained in the recesses, onto the base film.

A gravure roll used for a gravure coating process is designed to have various patterns of protrusions and recesses to be formed on a surface thereof, and a depth of recesses in accordance with a desired coating pattern and/or a coating volume for various purposes.

A non-aqueous electrolytic secondary battery, a typical one of which is a lithium secondary battery, includes a separator electrically insulating a cathode and an anode from each other, and having a function of retaining an electrolyte. A separator is generally designed to further have a "shut-down" function of prohibiting passage of ions between a cathode and an anode when heat is abnormally generated, to thereby prevent further heat generation.

As a separator having the above-mentioned "shut-down" function, there has been reported a separator comprised of a porous polyolefin film, and a heat resistant layer containing inorganic fillers therein, formed on a surface of the polyolefin film (see the patent document 1, for instance). The heat resistant layer has a function of maintaining a shape thereof to thereby prevent a cathode and an anode from making direct contact with each other, even if the porous polyolefin film in the separator is molten due to enormous heat generation.

The heat resistant layer in the above-mentioned separator is fabricated by coating a coating liquid containing inorganic fillers such as silica particles and alumina particles, and binder resin, onto a surface of a porous polyolefin film as a base film. A gravure coating process is suitable to a coating step for fabricating a heat resistant layer in the case of industrially fabricating a large-area separator.

PRIOR ART DOCUMENTS

Patent Documents

Patent document 1: Japanese patent No. 3756815

BRIEF SUMMARY OF THE INVENTION

Problems to be Solved by the Invention

However, a gravure coating process including the step of coating a coating liquid containing therein hard inorganic fillers such as silica particles and alumina particles, onto a surface of a porous polyolefin film is accompanied with the following problems (1) and (2).

(1) A gravure roll is abraded at a surface thereof by hard inorganic fillers such as silica particles and alumina particles during a gravure coating process. That is, there occurs "roll abrasion", resulting in that impurities derived from an underlying metal of a gravure roll are mixed into a separator. The roll abrasion occurs in particular at summits of protrusions formed on a surface of a gravure roll, through which the gravure roll makes direct contact with a base film.

(2) Inorganic fillers are aggregated on and stick to a surface of a gravure roll, resulting in that recesses formed on a surface of a gravure roll are clogged with the lapse of time while the gravure roll is being used.

In view of the above-mentioned problems in the prior art, it is an object of the present invention to provide a gravure roll capable of preventing occurrence of roll abrasion to thereby make it possible to carry out stable coating, even if a coating liquid containing therein hard inorganic fillers is used. It is another object of the present invention to provide a method of fabricating a separator, including a step of coating a coating liquid onto a base film through the use of the above-mentioned gravure roll.

Solution to the Problems

The prevention invention provides a gravure roll identified below.

[1] A gravure roll including a roll body composed of a metal, a plurality of protrusions formed on an outer surface of the roll body, and obliquely extending at a predetermined angle relative to a central axis of the roll body, and a diamond-like carbon (DLC) layer entirely covering an outer surface of the roll body therewith, a plurality of obliquely extending recesses being formed between the adjacent protrusions, each of the recesses retaining a coating liquid therein, each of the obliquely extending protrusions having a cross-section including a head portion comprised of a flat surface, and a pair of sidewalls having a width gradually reducing towards the head portion.

[2] The gravure roll as set forth in [1], wherein the cross-section is trapezoidal.

[3] The gravure roll as set forth in [1], wherein the DLC layer is water-repellent.

[4] The gravure roll as set forth in [1], wherein the DLC layer has a thickness equal to or greater than 0.1 micrometer, but equal to or smaller than 3.0 micrometers.

[5] The gravure roll as set forth in [1], wherein the gravure roll further includes an intermediate layer between the outer surface of the roll body and the DLC layer.

[6] The gravure roll as set forth in [5], wherein the intermediate layer is composed of hard chromium.

[7] The gravure roll as set forth in [6], wherein the intermediate layer has a thickness equal to or greater than 10 micrometers, but equal to or smaller than 30 micrometers.

[8] The gravure roll as set forth in [1], wherein each of the obliquely extending recesses has a trapezoidal cross-section.

That is, a gravure roll in accordance with the present invention is comprised of a gravure roll including a roll body composed of a metal, a plurality of protrusions formed on an outer surface of the roll body, and obliquely extending at a predetermined angle relative to a central axis of the roll body, and a plurality of recesses each formed between the adjacent obliquely extending protrusions, each of the recesses retaining a coating liquid therein, characterized in that the roll body is entirely covered on an outer surface thereof with a DLC layer, and each of the obliquely extending protrusions has a trapezoidal cross-section a head of which is cut down and which has a width gradually reducing towards the head.

The gravure roll in accordance with the present invention is partially characterized in that a roll body composed of a metal is entirely covered at an outer surface thereof with a DLC layer.

Diamond like carbon of which the DLC layer is composed is a carbon material containing diamond-like carbon-carbon bonding, and has various advantages in a desired balance. For instance, DLC has a high hardness, a high resistance to abrasion, and a low frictional coefficient, and is chemically inactive and stable, and further, is not corroded even in a corrosion environment. A DLC layer can be fabricated by a conventional film-fabrication process such as chemical vapor deposition (CVD).

Thus, a DLC layer not only has a function of acting as a protection layer for protecting a roll body composed of a metal from hard inorganic fillers, but also prevents a base film and a doctor blade from being abraded and/or damaged when a gravure roll coats a coating liquid onto the base film or when a gravure roll slides with the doctor blade.

Each of the obliquely extending protrusions defining raised and recessed portions of the gravure roll is cut down at a head thereof, and is provided with enhanced slidability by means of the above-mentioned DLC layer. Thus, even if the obliquely extending protrusions make contact with a based film onto which a coating liquid is to be coated, it is possible to prevent the base film from being scratched, and further, to prevent obliquely extending protrusions from being abraded.

Furthermore, since each of the obliquely extending protrusions has a trapezoidal cross-section having a width gradually reducing towards a head thereof, it is possible to cause a coating liquid retained in each of a plurality of obliquely extending recesses formed between the adjacent obliquely extending protrusions, to be smoothly fed out along sidewalls of the obliquely extending protrusions, it is possible to reduce a volume of a coating liquid remaining in the obliquely extending recesses, and further, prevent the recesses from being clogged, ensuring superior coating performance.

It is preferable that the above-mentioned DLC layer is water-repellent.

As mentioned above, DLC has a high resistance to both abrasion and chemicals. However, inorganic fillers may be aggregated, if a coating liquid containing therein water solvent sticks to a surface of the DLC layer formed on a surface of a gravure roll, in which case, a volume of a coating liquid retained at a gravure roll fluctuates, and hence, it is not possible to stably carry out coating.

Thus, by designing the DLC layer to be water-repellent, a coating liquid containing therein water solvent is unlikely to stick to inorganic fillers, and thus, it is possible to prevent the recesses from being clogged, ensuring that superior coating performance can be maintained. In order for the DLC layer to be water-repellent, fluorine may be doped into a DLC layer during fabrication thereof, for instance.

In the gravure roll in accordance with the present invention, the DLC layer entirely covering the roll body therewith preferably has a thickness equal to or greater than 0.1 micrometer, but equal to or smaller than 3 micrometers. By having a thickness in this range, the DLC layer can sufficiently provide the above-mentioned performances.

The DLC layer covering the roll body therewith may be fabricated by CVD, for instance. In dependence on a material of which the roll body is made, the DLC layer may have insufficient adhesion. Furthermore, if the DLC layer has a defectiveness, for instance, if the DLC layer is cracked during fabrication thereof or during the gravure roll is being used, a coating liquid penetrates the DLC layer through a defectiveness, resulting in that a metal of which the roll body is made may be corroded.

Thus, it is preferable that the gravure roll in accordance with the present invention includes an intermediate layer between an outer surface of the roll body and the DLC layer in order to enhance adhesion between the DLC layer and the roll body, and further, to prevent a metal of which the roll body is made from making direct contact with a coating liquid, even if a coating liquid penetrates the DLC layer through a defectiveness.

As a material of which the intermediate layer is made, there is selected a material having high adhesion with both the DLC layer made of a carbon material and the roll body made of a metal, and further having a high resistance to components of a coating liquid. As a preferable material, there is selected hard chromium or nickel, and preferably selected hard chromium. A thickness of the intermediate layer is selected in such a range that the above-mentioned performances of the intermediate layer can be obtained. In the case that the intermediate layer is composed of hard chromium, it is preferable that the intermediate layer has a thickness in the range of 10 to 30 micrometers both inclusive.

In the gravure roll in accordance with the present invention, it is preferable that each of the obliquely extending recesses has a trapezoidal cross-section.

By designing each of the obliquely extending recesses formed between the obliquely extending protrusions, to have a trapezoidal cross-section, it is possible to prevent a coating liquid from remaining at a bottom of each of the obliquely extending recesses, ensuring that the recesses are prevented from being clogged.

Furthermore, the present invention provides a method of fabricating a separator, and a separator, as identified below.

[9] A method of fabricating a separator, including a first step of operating the gravure roll defined in [1], and a second step of coating a coating liquid onto a base film through the use of the gravure roll.

[10] The method as set forth in [9], wherein the coating liquid contains inorganic fillers therein.

[11] The method as set forth in [10], wherein, in the second step, the coating liquid containing inorganic fillers therein is coated onto the base film for forming a heat-resistant layer containing inorganic fillers therein on a surface of the base film such that a difference between a maximum and a minimum in a weight per unit area of the separator in a length-wise direction thereof, measured every 100 meters interval, is equal to or smaller than 2 grams/m².

[12] A separator including a base film, and a heat-resistant layer containing inorganic fillers therein and formed on a surface of the base film, a difference between a maximum and a minimum in a weight per unit area of the separator in a length-wise direction thereof, measured every 100 meters interval, being equal to or smaller than 2 grams/m².

In the method of fabricating a separator, in accordance with the present invention, since the gravure roll in accordance with the present invention, having the advantages as mentioned above is employed, it is possible to coat a uniform volume of a coating liquid onto a base film. Furthermore, since the gravure roll has superior slidability, a base film is unlikely to be abraded and/or damage, even if the gravure roll makes contact with the base film onto which a coating liquid is coated.

Accordingly, the method of fabricating a separator, in accordance with the present invention, makes it possible to stably coat a uniform volume of a coating liquid onto a surface of a base film, ensuring it possible to fabricate separators having uniform quality with a high yield. In particular, it is possible to fabricate a separator in which a difference between a maximum and a minimum in a weight per unit area thereof in a length-wise direction thereof, measured every 100 meters interval, is equal to or smaller than 2 grams/m².

Advantages Provided by the Invention

The present invention provides a gravure roll capable of preventing a roll body from being abraded, even if a coating liquid containing therein hard inorganic fillers is used, preventing a base film from being scratched, even if the gravure roll makes contact with the base film onto which a coating liquid is to be coated, and stably carrying out a gravure coating process. Furthermore, by using the gravure roll, it is possible to fabricate a separator having a uniform weight per unit area with a high yield.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings like reference characters designate the same or similar parts throughout the drawings.

EMBODIMENT FOR REDUCING THE INVENTION TO PRACTICE

Preferred embodiments in accordance with the present invention will be explained hereinbelow with reference to drawings. Parts or elements common in all drawings are provided with the same reference numerals, and will not be doubly explained.

In the embodiments explained hereinbelow, there is explained a case that a heat-resistant layer is coated onto a porous polyolefin film in a separator used in a secondary battery. However, it should be noted that this case is just an example in which the gravure roll in accordance with the present invention is suitably used. Purposes on which the gravure roll in accordance with the present invention is used are not to be limited to the example.

First Embodiment

Figure 1:
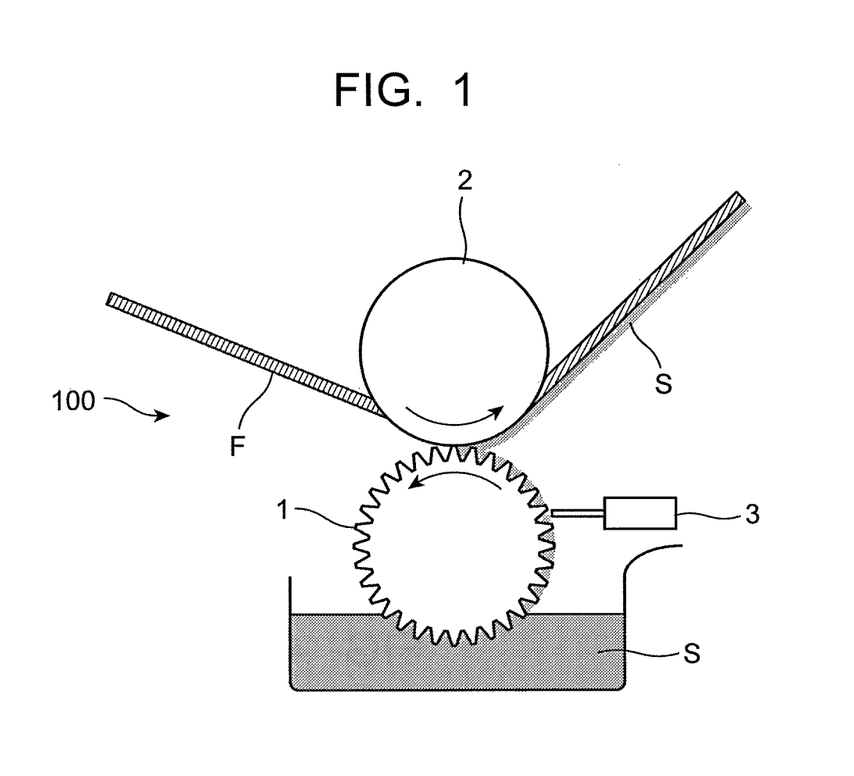
FIG. 1 illustrates primary parts of an apparatus for carrying out a gravure coating process, in accordance with an embodiment of the present invention.

How to use an apparatus 100 for carrying out a gravure coating process, including a gravure roll in accordance with the first embodiment of the present invention, is described hereinbelow with reference to FIG. 1.

The apparatus 100 for carrying out a gravure coating process includes, as primary parts, a gravure roll 1, a backup roll 2, and a doctor blade 3.

The gravure roll 1 includes a plurality of obliquely extending recesses, as detailed later. The gravure roll 1 is rotated by a driver (not illustrated) in such a condition that a lower portion thereof is soaked in a coating liquid S, and thus, coats the coating liquid S onto a base film F with the coating liquid being retained in the obliquely extending recesses.

The backup roll 2 allows the gravure roll 1 to stably coat the coating liquid onto the base film F. The doctor blade 3 controls a volume of the coating liquid to be retained on a surface of the gravure roll 1.

The coating liquid S contains therein inorganic fillers, binder resin, and solvent. As solvent, there may be used water, alcoholic solvent such as isopropyl alcohol, nonprotic polar solvent such as N, N-dimethylacetamid and N-methylpyrrolidone, ether solvent such as tetrahydrofuran, ketone solvent such as acetone and cyclohexanone, or mixture thereof. It is preferable that the coating liquid S is comprised of water-containing coating liquid, that is, the coating liquid S contains water as solvent. By using such solvent, there is provided a coating liquid capable of stably carrying out a gravure coating process.

As inorganic fillers, there may be used silica particles, titania particles, alumina particles, and so on. As binder resin, there may be used water-soluble resin such as carboxymethylcellulose and polyvinyl alcohol, fluorine containing resin such as polyvinylidene fluoride, rubber such as styrene-butadiene rubber, or acrylic resin. Binder resin may be slightly dispersed in a solvent without being solved in the solvent, that is, may be used as emulsion. Specifically, as the inorganic fillers and the binder resin, Japanese Patent Application Publication No. 2013-46998 discloses preferable example of inorganic fillers and binder resin.

The base film onto which the coating liquid is coated is comprised of a porous polyolefin film capable of providing a shut-down function to a separator. Specifically, Japanese Patent Application Publication No. 2013-46998 discloses a preferable example of a porous polyolefin film.

The gravure roll 1 in accordance with the first embodiment is explained hereinbelow in detail.

Figure 2:
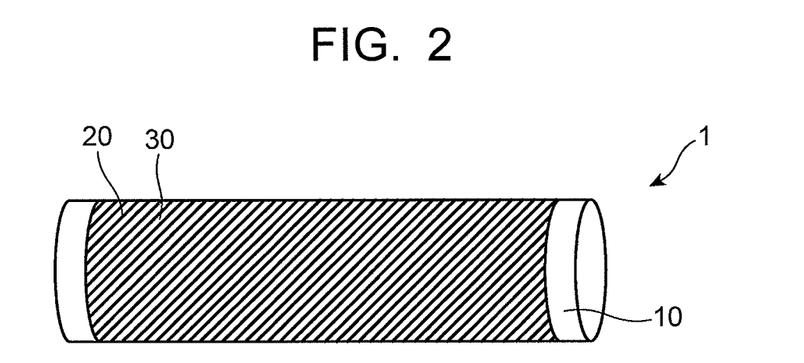
FIG. 2 is a perspective view of the gravure roll in accordance with an embodiment of the present invention.
Figure 3:
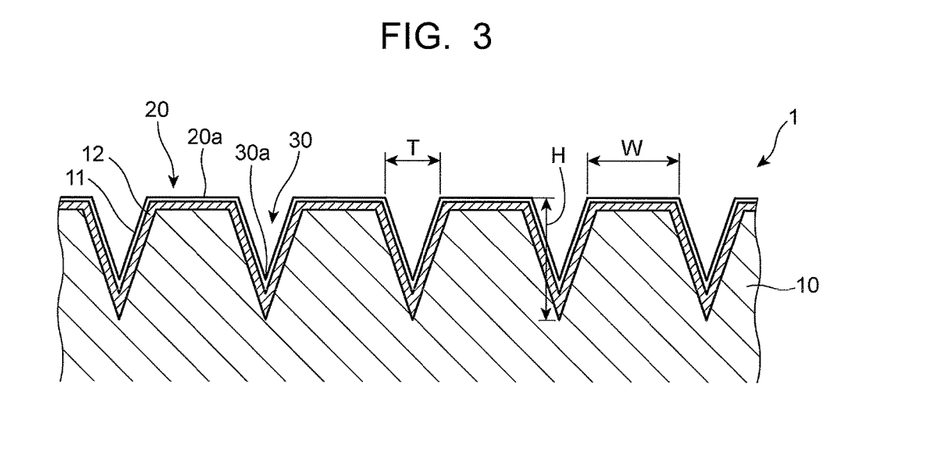
FIG. 3 is an enlarged cross-sectional view of a plurality of the obliquely extending protrusions and a plurality of the obliquely extending recesses both formed on a surface of the gravure roll in accordance with the first embodiment of the present invention.

FIG. 2 is a perspective view of the gravure roll 1, and FIG. 3 is an enlarged cross-sectional view of a plurality of the obliquely extending protrusions 20 and a plurality of the obliquely extending recesses 30 both formed on an outer surface of the gravure roll 1. In FIG. 3, the curvature of the gravure roll 1 is not illustrated.

The roll body 10 of the gravure roll 1 is formed on an outer surface thereof with a plurality of obliquely extending protrusions 20 and a plurality of obliquely extending recesses 30. The roll body 10 in the first embodiment has a diameter of 150 mm and a length of 800 mm, and is made of stainless steel. It should be noted that a size of the roll body 10 and a material of which the roll body 10 is made are not to be limited to the above-mentioned ones, but to be suitably determined in accordance with purposes thereof.

As illustrated in FIG. 3, the roll body 10 is covered entirely on an outer surface thereof with a DLC layer 11. An intermediate layer 12 is formed between the roll body 11 and the DLC layer 11.

DLC (diamond like carbon) of which the DLC layer 11 is composed is a carbon material containing diamond-like carbon-carbon bonding therein, and has various advantages in a desired balance. For instance, DLC has a high hardness, a high resistance to abrasion, and a low frictional coefficient in a lubrication environment, does not abrade and scratch an object with which the gravure roll slides (a low-attacking characteristics), is chemically inactive and stable, and further, is not corroded even in a corrosion environment.

The DLC layer in the first embodiment has a thickness of 1 micrometer. It is preferable that the DLC layer 11 has a thickness equal to or greater than 0.1 micrometer, but equal to or smaller than 3.0 micrometers. By having a thickness in the range, the DLC layer is able to maintain a resistance to chemicals to thereby effectively prevent dried and aggregated slurry from sticking thereto. A thickness of the DLC layer can be measured by means of an optic interference-type measurement device or a laser displacement gauge. A preferable example of an optic interference-type measurement device is MODEL: EL2 commercially available from Yugen Kaisha Opt-electronics Laboratory.

DLC of which the DLC layer 11 is made is water-repellent DLC. Though DLC may be hydrophilic in dependence on a content of elemental carbons, DLC can be water-repellent by dispersing fluorine in atomic or ionic condition.

DLC (fluorine DLC) containing therein fluorine having hydrophilic characteristics is more water-repellent than a DLC coating layer containing no fluorine therein, as well as having original characteristics of DLC such as a resistance to chemical and a resistance to abrasion. Accordingly, by designing the DLC layer 11 to be composed of fluorine DLC, the gravure roll in accordance with the present invention is able to prevent slurry from sticking thereto more effectively by virtue of hydrophilic characteristics of the DLC layer.

Between a surface of the roll body 10 and the DLC layer 11 is formed the intermediate layer 12 having a thickness of 15 micrometers and made of hard chromium. The intermediate layer 12 enhances adhesion between the roll body 10 and the DLC layer 11, and further, prevents a metal of which the roll body 10 is made from making direct contact with a coating liquid, even if a coating liquid leaks through a defectiveness of the DLC layer 11. Though the intermediate layer 12 in the first embodiment is designed to have a thickness of 15 micrometers, it should be noted that the intermediate layer can have any thickness if the thickness can enhances adhesion between the roll body 10 and the DLC layer 11, and prevent a metal of which the roll body 10 is made from making direct contact with a coating liquid, even if a coating liquid S leaks through a defectiveness of the DLC layer 11. In the case that the intermediate layer 12 is made of hard chromium, it is preferable that the intermediate layer has a thickness in the range of 10 to 30 micrometers both inclusive. A thickness of the intermediate layer can be measured by means of a laser displacement gauge.

The obliquely extending protrusions 20 are formed on an outer surface of the roll body 10 to be spiral at a predetermined angle relative to a central axis of the roll body 10. An angle between the obliquely extending protrusions 20 and the central axis of the roll body 10 is set to be equal to 45 degrees in the first embodiment, but may be changed into another angle, if necessary. Furthermore, as illustrated in FIG. 3, an upper portion 20a is cut out in each of the obliquely extending protrusions 20, and thus, each of the obliquely extending protrusions 20 has a trapezoidal cross-section having a width gradually decreasing towards the upper portion 20a. In other words, each of the obliquely extending protrusions 20 is designed to have a cross-section including a head portion 20a comprised of a flat surface, and a pair of sidewalls (no reference numbers) having a width gradually reducing towards the head portion 20a. For instance, each of the obliquely extending protrusions 20 has a trapezoidal cross-section.

Each of the obliquely extending recesses 30 is formed between the adjacent obliquely extending protrusions 20. As illustrated in FIG. 1, after the coating liquid S has been once retained in each of the obliquely extending recesses 30, the coating liquid S retained in each of the obliquely extending recesses 30 is coated onto a surface of the base film F when the gravure roll 1 makes contact with the continuously fed base film F.

In the gravure roll 1, a width W of the upper portion 20a is set to be 40 micrometers, a distance T between the adjacent upper portions 20a of the obliquely extending protrusions 20 is set to be 420 micrometers, and a height H of the obliquely extending recess 30 defined as a distance between the upper portion 20a of the obliquely extending protrusion 20 and the bottom 30a is set to be 184 micrometers.

The distance T and the height H define a volume of each of the obliquely extending recesses 30, and hence, are determined in dependence on a desired volume of a coating liquid to be retained, that is, a volume of a coating liquid to be used in a single coating step. The width W of the upper portion 20a is set to be generally in the range of 10 to 50 micrometers both inclusive, the distance T between the adjacent upper portions of the obliquely extending protrusions is set to be generally in the range of 100 to 500 micrometers both inclusive, and the height H of each of the obliquely extending recesses is set to be generally in the range of 100 to 300 micrometers both inclusive.

The obliquely extending protrusions 20 and the obliquely extending recesses 30 of the gravure roll 1 can be formed by spirally grinding the unprocessed roll body 10 by engraving to thereby define the obliquely extending recesses 30, and cutting summits of the protrusions to thereby define the obliquely extending protrusions 20 (the upper portions 20a).

The separator can be obtained by drying the base film F onto which the coating liquid S has been coated.

The separator has a length generally in the range of 200 to 10000 meters both inclusive, preferably in the range of 500 to 5000 meters both inclusive, and more preferably in the range of 1000 to 3000 meters both inclusive. By cutting the separator into a suitable length, the separator can be used as a part of a battery.

A difference between a maximum and a minimum in a weight per unit area of the separator in a length-wise direction thereof, measured every 100 meters interval, is preferably equal to or smaller than 2 grams/m$^2$, more preferably equal to or smaller than 1 gram/m$^2$, and most preferably equal to or smaller than 0.5 gram/m$^2$. The smaller difference enables the separator to have more uniform quality.

The gravure roll in accordance with the present invention makes it possible to enable the roll body to be scarcely abraded, even if a coating liquid containing therein hard inorganic fillers is used, prevent the base film from being scratched, even if the gravure roll makes contact with the base film onto which a coating liquid is to be coated, and stably carry out a gravure coating process. Thus, there can be obtained a separator in which the above-mentioned difference is small and which has uniform quality.

Second Embodiment

A gravure roll in accordance with the second embodiment of the present invention is explained hereinbelow with reference to the drawings. Since the gravure roll in accordance with the second embodiment of the present invention, and an apparatus for carrying out a gravure coating process, including the gravure roll, are basically identical in structure with those having been explained in the first embodiment of the present invention with reference to FIGS. 1 and 2, explanation about the same elements as those in the first embodiment are simplified or omitted.

Figure 4:
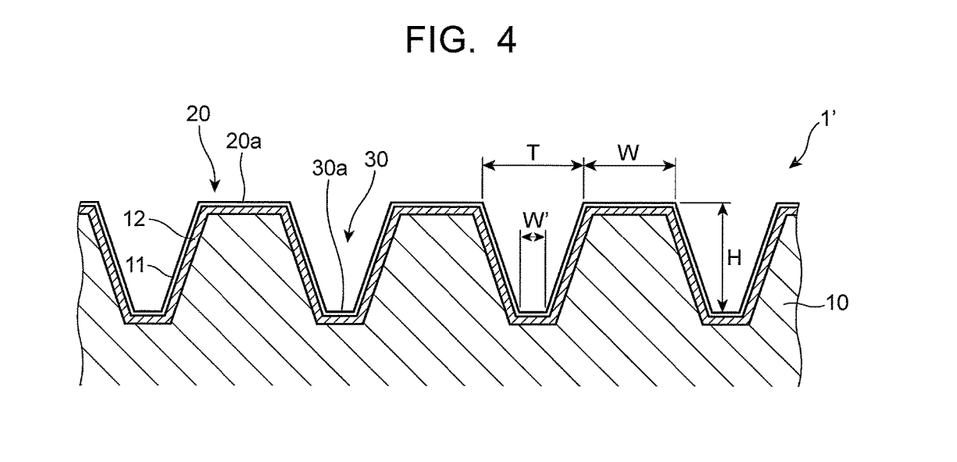
FIG. 4 is an enlarged cross-sectional view of a plurality of the obliquely extending protrusions and a plurality of the obliquely extending recesses both formed on a surface of the gravure roll in accordance with the first embodiment of the present invention.

FIG. 4 is an enlarged cross-sectional view of a plurality of the obliquely extending protrusions 20 and a plurality of recesses 30 formed on an outer surface of a gravure roll 1'. In FIG. 4, the curvature of the gravure roll is not illustrated.

In the gravure roll 1', a plurality of the obliquely extending protrusions 20 and a plurality of recesses 30 are formed on an outer surface of the roll body 10. The roll body 10 in the second embodiment is designed to have a diameter of 150 mm and a length of 800 mm, and is made of stainless steel. It should be noted that a size of the roll body 10 and a material of which the roll body 10 is made are not to be limited to the above-mentioned ones, but to be suitably determined in accordance with purposes thereof.

As illustrated in FIG. 4, the roll body 10 is entirely covered on an outer surface thereof with the DLC layer 11, and the intermediate layer 12 is formed between the roll body 10 and the DLC layer 11.

The structure and performances of the DLC layer 11 are identical with those in the first embodiment, and accordingly, are not explained.

The DLC layer 11 in the second embodiment is designed to have a thickness of 1 micrometer. It is preferable that the DLC layer 11 has a thickness equal to or greater than 0.1 micrometer, but equal to or smaller than 3.0 micrometers. By having a thickness in the range, the DLC layer is able to maintain a resistance to chemicals, and further, effectively prevent dried and aggregated slurry from sticking thereto. DLC of which the DLC layer 11 is made is water-repellent. Though DLC may be hydrophilic in dependence on a content of elemental carbons, DLC can be water-repellent by dispersing fluorine therein in atomic or ionic condition.

Between a surface of the roll body 10 and the DLC layer 11 is formed the intermediate layer 12 having a thickness of 15 micrometers and composed of hard chromium. The structure and performances of the intermediate layer 12 are identical with those in the first embodiment, and accordingly, are not explained.

The obliquely extending protrusions 20 are formed on an outer surface of the roll body 10 to make a predetermined angle relative to a center axis of the roll body 10. In the second embodiment, the angle of the obliquely extending protrusions 20 relative to a center axis of the roll body 10 is set to be 45 degrees, but it should be noted that the angle may be changed into another angle in dependence on necessity. Furthermore, as illustrated in FIG. 4, each of the obliquely extending protrusions 20 has a trapezoidal cross-section in which the upper portion 20a is cut out, and a width of the obliquely extending protrusion 20 gradually reduces towards the upper portion 20a.

Each of the obliquely extending recesses 30 is formed between the adjacent obliquely extending protrusions 20. Whereas the bottom 30a in each of the obliquely extending recesses 30 in the first embodiment is designed to make an acute angle, the bottom 30a in each of the obliquely extending recesses 30 in the second embodiment is designed to be flat. That is, each of the obliquely extending recesses 30 in the second embodiment is designed to have a trapezoidal cross-section.

In the case that the bottom 30a makes an acute angle, a volume of the coating liquid to be coated onto the base film fluctuates with the lapse of time, because the coating liquid S remains in the recess, or inorganic fillers contained in the coating liquid S are adhered to the bottom 30a, when the coating is temporarily stopped. In contrast, in the case that the bottom 30a is flat, and further, each of the obliquely extending recesses 30 has a trapezoidal cross-section, it is hard for the coating liquid S to remain in the obliquely extending recesses 30, a volume of the coating liquid to be coated onto the base film is made stable, and inorganic fillers can be readily removed, even if they are adhered to the bottom 30a.

In the gravure roll 1', a width W of the upper portion 20a is set to be 30 micrometers, a distance T between the adjacent upper portions 20a of the obliquely extending protrusions 20 is set to be 360 micrometers, a height H of the obliquely extending recess 30 defined as a distance between the upper portion 20a of the obliquely extending protrusion 20 and the bottom 30a is set to be 150 micrometers, and a width W' of the bottom 30a is set to be 65 micrometers.

The distance T, the height H, and the width W' of the bottom define a volume of each of the obliquely extending recesses 30, and hence, are determined in dependence on a desired volume of a coating liquid to be retained, that is, a volume of a coating liquid to be supplied in a single coating step. The distance T between the adjacent upper portions of the obliquely extending protrusions is set to be generally in the range of 100 to 500 micrometers both inclusive, the height H of each of the obliquely extending recesses is set to be generally in the range of 100 to 300 micrometers both inclusive, and the width W' of the bottom is set to be generally in the range of 50 to 200 micrometers both inclusive.

The obliquely extending protrusions 20 and the obliquely extending recesses 30 of the gravure roll 1' can be formed by spirally grinding the unprocessed roll body 10 by engraving to thereby define the obliquely extending recesses 30 (bottoms 30a), and cutting summits of remaining protrusions to thereby define the obliquely extending protrusions 20 (the upper portions 20a).

The separator can be obtained by drying the base film F onto which the coating liquid S has been coated.

The separator has a length generally in the range of 200 to 10000 meters both inclusive, preferably in the range of 500 to 5000 meters both inclusive, and more preferably in the range of 1000 to 3000 meters both inclusive. By cutting the separator into a suitable length, the separator can be used as a part of a battery.

A difference between a maximum and a minimum in a weight per unit area of the separator in a length-wise direction thereof, measured every 100 meters interval, is preferably equal to or smaller than 2 grams/m$^2$, more preferably equal to or smaller than 1 gram/m$^2$, and most preferably equal to or smaller than 0.5 gram/m$^2$. The smaller difference enables the separator to have more uniform quality.

The gravure roll in accordance with the present invention makes it possible to enable the roll body to be scarcely abraded, even if a coating liquid containing therein hard inorganic fillers is used, prevent the base film from being scratched, even if the gravure roll makes contact with the base film onto which a coating liquid is to be coated, and stably carry out a gravure coating process. Thus, there can be obtained a separator in which the above-mentioned difference is small and which has uniform quality.

The embodiments in accordance with the present invention have been explained so far with reference to the drawings. It should be noted that they are just examples of the present invention, and that any structure other than the above-mentioned ones may be selected as long as it is contained in the subject-matter of the present invention.

EXEMPLARY EMBODIMENTS

The present invention is explained hereinbelow in more detail, but the present invention is not to be limited to the explanation.

1. A Weight Per Unit Area in the Separator (Unit: g/m$^2$)

A square sample having a side of 0.08 meters was cut out of the separator, and a weight W (grams) of the sample was measured. The measured weight W (grams) was divided by an area S (m$^2$) (=0.08×0.08) of the separator to thereby calculate a weight per unit area (W/S) of the separator.

2. Base Film

There was prepared a mixture by 100 weight part, the mixture including high polymer polyethylene powder (GUR4032 commercially available from TICONA) by 70 weight %, and polyethylene wax (FNP-0115 commercially available from NIPPON SEIRO Co., Ltd.) having an average molecular weight of 1000, by 30 weight %. To the mixture were added oxidation inhibitor (Irg1010 commercially available from Ciba Specialty Chemicals Holding Inc.) by 0.4 weight part, oxidation inhibitor (P168 commercially available from Ciba Specialty Chemicals Holding Inc.) by 0.1 weight part, and sodium stearate by 1.3 weight part. Furthermore, calcium carbonate (commercially available from MARUO CALCIUM CO., LTD.) having an average particle diameter of 0.1 micrometer were added such that calcium carbonate has 38 volume % relative to the total volume. After the resultant mixture was stirred in a Henschel mixer with the mixture being remained to be in powder condition, the mixture was molten and mixed in a bi-axial mixer into polyolefin resin composition.

The resultant polyolefin resin composition was rolled by means of a pair of rolls having been heated at a surface thereof up to 150 degrees centigrade, to thereby fabricate a sheet. By immersing the sheet into aqueous solution of hydrochloric acid (hydrochloric acid 4 mol/liter, non-ionic surfactant 0.5 weight %), calcium carbonate was removed out of the sheet. Then, the sheet was rolled by a certain magnification in a condition of 105 degrees centigrade to thereby obtain a porous polyolefin film (A) having a thickness of 16 micrometers, a porosity of 53%, and air permeability of 100 seconds/100 cc.

3. Coating Liquid

There was prepared a coating liquid (A) by adding and mixing carboxymethyl cellulose (CMC) (1110 commercially available from Daicel Fine Chem Ltd.) having a true specific gravity of 1.6 g/cm$^3$, and alumina powder (AKP3000 commercially available from Sumitomo Chemical Co., Ltd.) having a true specific gravity of 4.0 g/cm$^3$ to a solvent such that a weight ratio of CMC and alumina power was 3:100 and a solid concentration was 28 weight %. The solvent contained water and isopropyl alcohol by a weight ratio of 95:5.

Exemplary Embodiment 1

A coating liquid was coated onto a base film through the use of an apparatus for carrying out a gravure coating process, including the gravure roll in accordance with the above-mentioned first embodiment. A thickness of the DLC layer 11 was measured by means of an optic interference-type gauge (MODEL: EL2 commercially available from Opto-Electronics Laboratory, Inc.). A thickness of the intermediate layer 12 was measured by means of a laser displacement gauge.

The coating liquid (A) was coated onto a surface of the base film, that is, the porous polyolefin film (A) to which corona treatment was applied. Thereafter, the coating liquid was dried at 70 degrees centigrade to thereby obtain a separator (A) having a length of 1500 meters.

A weight per unit area of the resultant separator (A) was measured at 16 points by 100 meters interval. The measurement results are shown in Table 1.

Comparative Example 1

Through the use of an apparatus for carrying out a gravure coating process, including a gravure roll having the same structure as that of the gravure roll in accordance with the above-mentioned first embodiment except no inclusion of the DLC layer, the coating liquid (A) was coated onto a surface of the base film, that is, the porous polyolefin film (A) to which corona treatment was applied. Thereafter, the coating liquid was dried at 70 degrees centigrade to thereby obtain a separator (B) having a length of 1500 meters.

A weight per unit area of the resultant separator (B) was measured at 16 points by 100 meters interval. The measurement results are shown in Table 1.

TABLE 1

| | Distance from Point 1 | A weight per unit area in Exemplary Embodiment 1 (g/m$^2$) | A weight per unit area in Comparative Example 1 (g/m$^2$) |
| --- | --- | --- | --- |
| Point 1 | 0 m | 18.06 | 19.23 |
| Point 2 | 100 m | 18.30 | 18.86 |
| Point 3 | 200 m | 18.19 | 18.83 |
| Point 4 | 300 m | 18.56 | 18.89 |
| Point 5 | 400 m | 18.41 | 18.34 |
| Point 6 | 500 m | 18.28 | 18.25 |
| Point 7 | 600 m | 18.41 | 18.05 |
| Point 8 | 700 m | 18.06 | 18.03 |
| Point 9 | 800 m | 18.09 | 17.63 |
| Point 10 | 900 m | 18.13 | 17.42 |
| Point 11 | 1000 m | 18.22 | 17.56 |
| Point 12 | 1100 m | 17.97 | 17.44 |
| Point 13 | 1200 m | 17.86 | 17.31 |
| Point 14 | 1300 m | 18.06 | 17.28 |

TABLE 1-continued

| Distance from Point 1 | A weight per unit area in Exemplary Embodiment 1 (g/m²) | A weight per unit area in Comparative Example 1 (g/m²) |
|---|---|---|
| Point 15 | 1400 m | 17.88 | 17.34 |
| Point 16 | 1500 m | 17.95 | 16.92 |
| Difference between Max. and Min. | | 0.70 | 2.31 |

INDUSTRIAL APPLICABILITY

The gravure roll in accordance with the present invention makes it possible to prevent a roll body from being abraded, even if a coating liquid containing therein hard inorganic fillers is used, prevent a base film from being scratched, even if the gravure roll makes contact with the base film onto which a coating liquid is to be coated, and stably carry out a gravure coating process, and accordingly, is industrially useful. A method of fabricating a separator, including a step of coating a coating liquid onto a base film through the use of the above-mentioned gravure roll, makes it possible to fabricate a separator having a uniform weight per unit area, with a high yield.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

We claim:

1. A gravure roll including:
 a roll body composed of a metal,
 a plurality of protrusions formed on an outer surface of the roll body, and obliquely extending at a predetermined angle relative to a central axis of the roll body, and
 a water-repellent diamond-like carbon (DLC) layer entirely covering an outer surface of the roll body therewith, wherein the water-repellent diamond-like carbon (DLC) layer contains fluorine,
 a plurality of obliquely extending recesses being formed between the adjacent protrusions, each of the recesses retaining a coating liquid therein,
 each of the obliquely extending protrusions having a cross-section including a head portion comprised of a flat surface, and a pair of sidewalls of a single protrusion of the plurality of protrusions having a distance between them which gradually reduces towards the head portion,
 each of the obliquely extending recesses having a cross-section including a bottom portion comprised of a flat surface, and a pair of sidewalls of adjacent protrusions of the plurality of protrusions having a distance between them which gradually reduces towards the bottom portion,
 the bottom portion of each of the obliquely extending recesses having a width W' greater than a width W of the head portion of each of the obliquely extending protrusions.

2. The gravure roll as set forth in claim 1, wherein each of the obliquely extending protrusions has a trapezoidal cross-section.

3. The gravure roll as set forth in claim 1, wherein the DLC layer has a thickness equal to or greater than 0.1 micrometer, but equal to or smaller than 3.0 micrometers.

4. The gravure roll as set forth in claim 1, wherein the gravure roll further includes an intermediate layer between the outer surface of the roll body and the DLC layer.

5. The gravure roll as set forth in claim 4, wherein the intermediate layer is composed of hard chromium.

6. The gravure roll as set forth in claim 5, wherein the intermediate layer has a thickness equal to or greater than 10 micrometers, but equal to or smaller than 30 micrometers.

7. The gravure roll as set forth in claim 1, wherein each of the obliquely extending recesses has a trapezoidal cross-section.

8. The gravure roll as set forth in claim 1, wherein the predetermined angle is equal to 45 degrees.

9. The gravure roll as set forth in claim 1, wherein the width W of the head portion is in the range of 10 to 50 micrometers inclusive and the width W' of the bottom portion is in the range of 50 to 200 micrometers inclusive.

* * * * *